Jan. 20, 1959     H. HUBER ET AL     2,869,490
FERTILIZER DRILL AND SEED PLANTING IMPLEMENT
Filed March 15, 1954     5 Sheets-Sheet 1

INVENTORS
Henry Huber
Isaac Craven
BY
ATTORNEYS

INVENTORS
Henry Huber
Isaac Craven

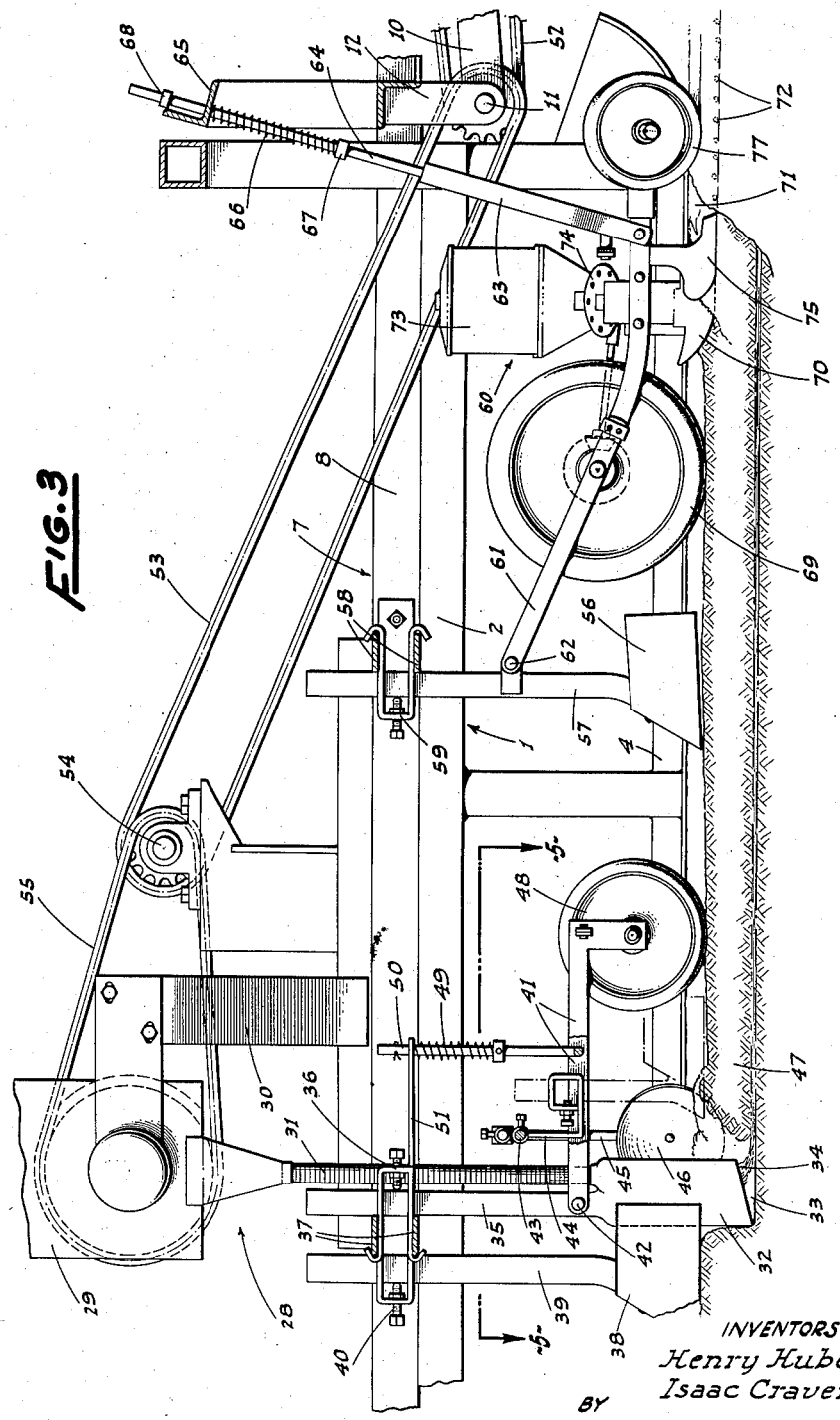

Jan. 20, 1959     H. HUBER ET AL     2,869,490
FERTILIZER DRILL AND SEED PLANTING IMPLEMENT
Filed March 15, 1954     5 Sheets-Sheet 4
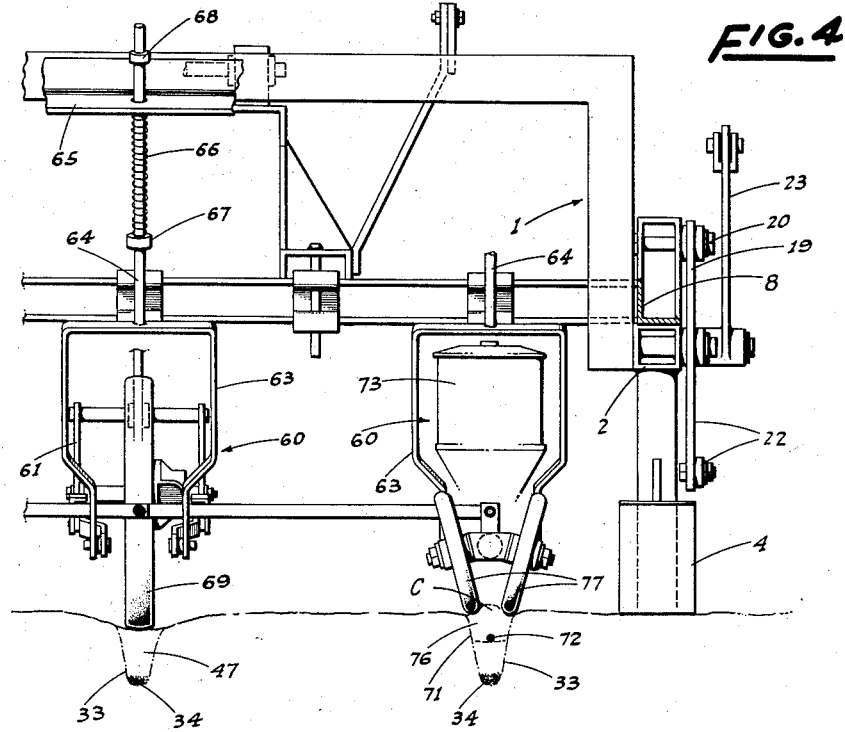
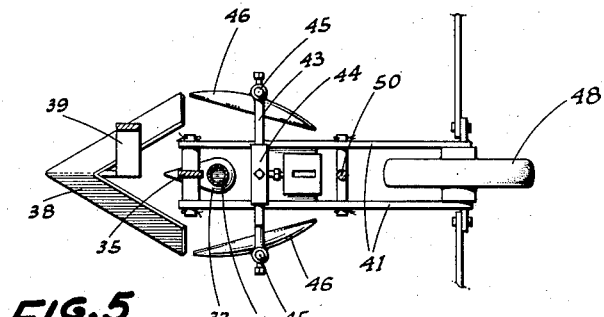
INVENTORS
Henry Huber
Isaac Craven
BY
ATTORNEYS

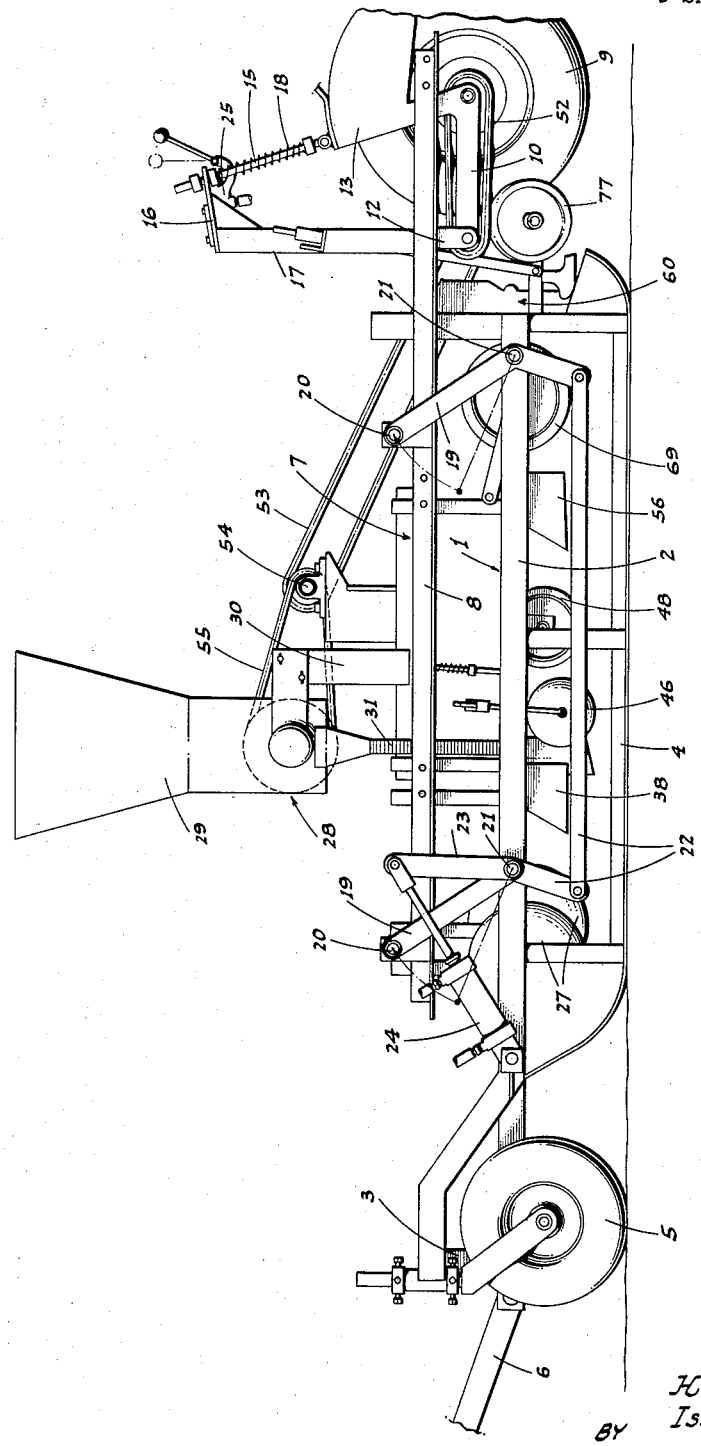

United States Patent Office 2,869,490
Patented Jan. 20, 1959

2,869,490

FERTILIZER DRILL AND SEED PLANTING IMPLEMENT

Henry Huber and Isaac Craven, Walnut Grove, Calif., assignors to Albert Jongeneel, Walnut Grove, Calif.

Application March 15, 1954, Serial No. 416,085

2 Claims. (Cl. 111—80)

This invention relates to agricultural implements particularly to one for speed planting.

The major purpose of the invention is to provide an implement of this general type by means of which seed may be planted in a bed specially prepared by the machine, and which bed includes fertilizer in the ground directly below but spaced from the seed so that the latter will not be burned, but so that the fertilizer will be available to nurture the roots as they form and grow.

Specifically, the machine includes instrumentalities which, with a single pass of the machine or as a continuous operation, digs a furrow, deposits fertilizer in the furrow, refills the furrow with dirt, smooths and repacks this dirt, forms another relatively shallow furrow in the repacked dirt, deposits the seed in successive order in this furrow, and finally fills in said latter furrow.

As a result of the use of this machine, it has been found that very accurate seed planting is possible and improved seed germination and/or emergence is obtained due to the excellence of the seed bed and to the accurate planting depth control which is provided by the machine.

A further object of the invention is to provide means whereby all the instrumentalities enumerated may be lifted clear of the ground simultaneously and without disturbing their setting relative to each other when it is desired to make a turn at the end of a row, or for transportation of the machine.

Still another object of the invention is to provide a fertilizer drill and seed planting implement which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 3 is an enlarged fragmentary sectional elevation on line 3—3 of Fig. 1, and showing as well the functioning of the various instrumentalities of the machine in the preparation of the seed bed.

Fig. 4 is a fragmentary transverse sectional elevation substantially on line 4—4 of Fig. 1, but with certain parts omitted to show particularly the initial and final pressing down action of the rollers on the dirt before and after the seed has been planted.

Fig. 5 is a fragmentary sectional plan on line 5—5 of Fig. 3.

Fig. 6 is a side elevation of the machine, showing the bed-preparing parts in a raised position.

Figure 1:
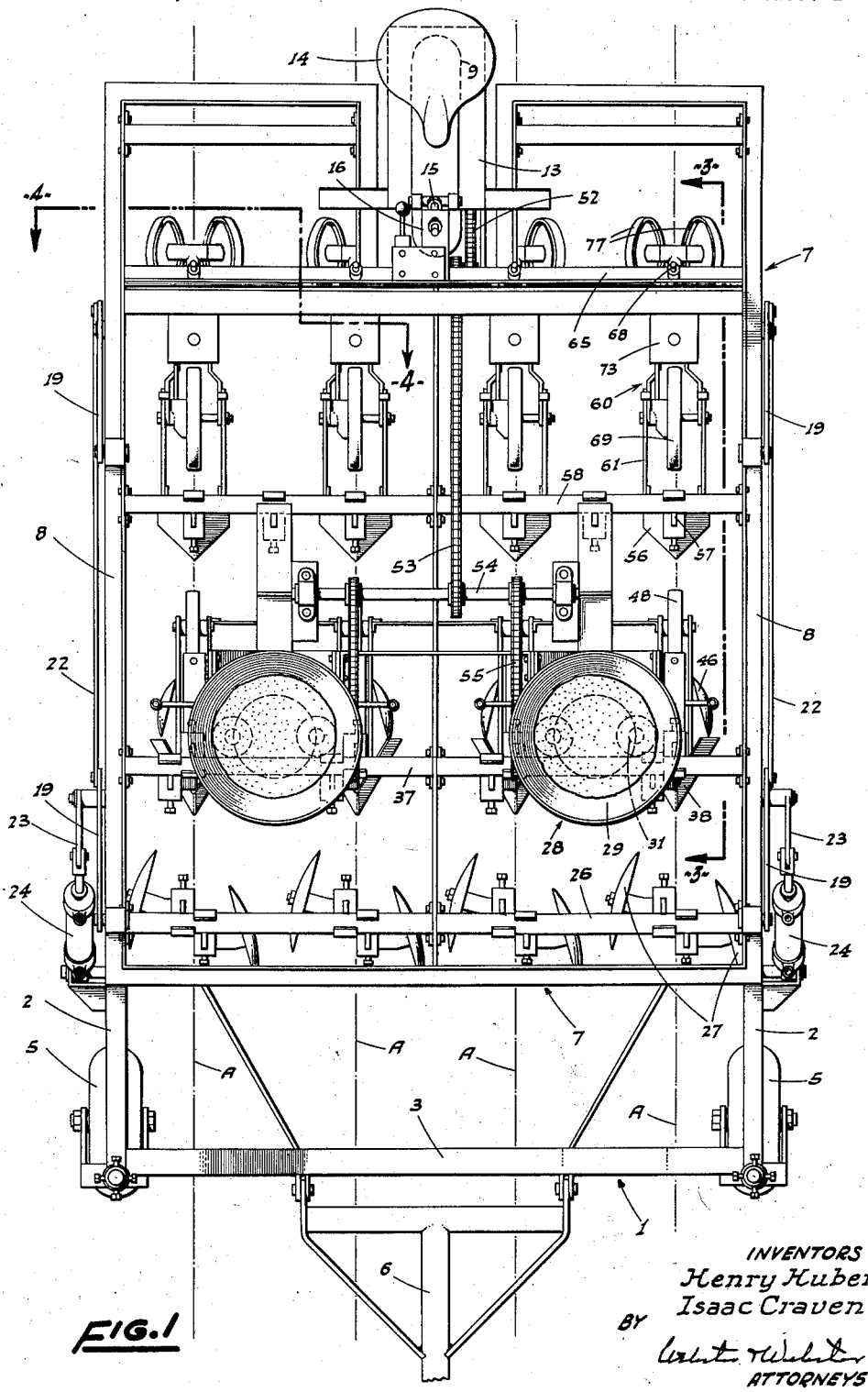
Fig. 1 is a top plan view of the machine, with the bed-preparing parts in their working position.
Figure 2:
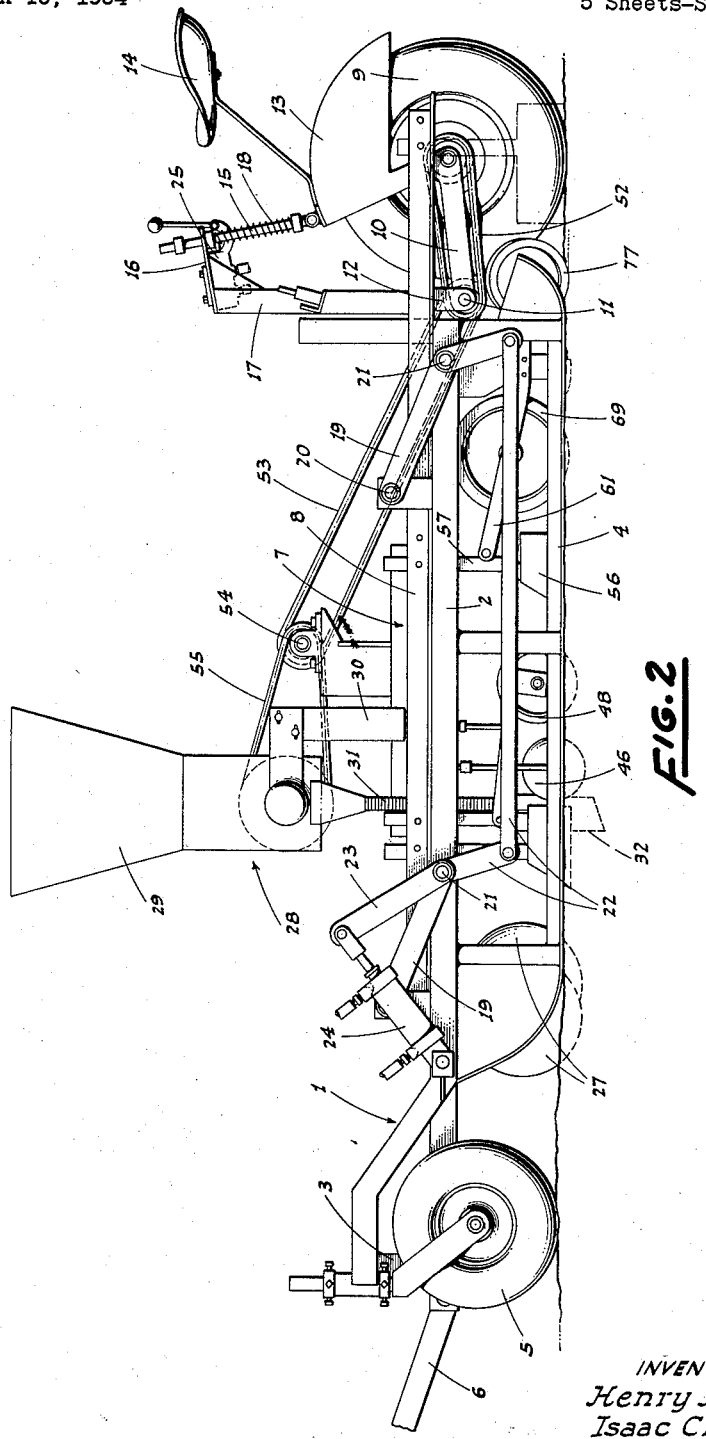
Fig. 2 is a side elevation of the same.

Referring now more particularly to the characters of reference on the drawings, the machine, as here shown, is designed to simultaneously prepare four seed beds along the lines A in Fig. 1, although the machine may be made to prepare a fewer or a larger number of beds as may be desired.

Such machine, for any number of rows, comprises a rectangular horizontal main frame 1 which includes side beams 2 and a cross front beam 3; the beams 2 being disposed laterally out from the outermost seed-bed lines A.

Beams 2 are supported from the ground by elongated runners 4 thereunder, and at their forward end by caster wheel units 5. A draft tongue 6, adapted for connection to a tractor, is connected to cross beam 3.

Disposed within frame 1 is the auxiliary frame 7 which supports the various units of the seed-bed preparing and planting apparatus. This frame includes side beams 8 overlying the side beams 2 and resting on the same when the machine is in operation.

Frame 7 projects rearwardly from frame 1 some distance; centrally of its width a wheel 9—normally resting on the ground between the central ones of rows A— is disposed adjacent the rear end of said frame 7. This wheel is mounted on and between forwardly projecting arms 10 pivoted at their forward ends, as at 11, on brackets 12 depending from frame 7 so that the wheel may follow ground indulations without affecting frame 7.

A hood 13, rigid with arms 10, overhangs the top portion of wheel 9 and supports an operator's seat 14.

A rod 15 projects upwardly from the hood and slides through a bracket 16 mounted on a post 17 upstanding from frame 7. A spring 18 on the post tends to urge the wheel downwardly to increase its traction which, of course, is also increased whenever an operator is on the seat.

Frame 7 is raised from its normal lowered position, when desired and as shown in Fig. 6, by means of longitudinally extending arms 19 on each side pivoted at their upper ends to beam 8, as at 20, and at their lower ends to beam 2, as at 21.

The arms on each side are connected for simultaneous swinging by a suitable connecting unit 22. Each foremost arm 19 is rigid with another arm 23 connected at its outer end to one end of a hydraulic ram 24 mounted at its other end on beam 2.

The ram is supplied with fluid under pressure from a pump mounted on the tractor as usual; flow of the fluid to the ram being controlled by a valve unit 25 interposed in the pressure line and mounted on the bracket 16 within reach of the operator on the seat 14.

Mounted on the frame 7, above and for each bed A, are the bed-preparing and seeding devices disposed in a row, and since each row of such devices is the same, a description of one such row will suffice for all.

Supported from a cross beam 26 mounted on frame 7 adjacent its forward end, are diagonaled ground loosening discs 27 disposed on opposite sides of a seed-bed line A.

Rearwardly of discs 27, a fertilizing unit 28 is mounted on the frame 7. This unit is of conventional character and comprises a hopper 29 for the fertilizer fixed on a bracket 30 upstanding from frame 7. A flexible feed tube 31 depends from the hopper and discharges into a furrow opening shoe 32 which forms the furrow 33, into the bottom of which the fertilizer 34 is deposited.

A standard 35 projects upwardly from shoe 32 and is adjustably secured by a clamping unit 36 to cross bars 37 extending between side beams 8 of frame 7.

Immediately ahead of shoe 32, a triangular ground leveling and dirt deflecting blade 38 is disposed; this blade having an upstanding standard 39 which is adjustably secured to cross bars 37 by a clamping unit 40.

Mounted in connection with the furrow forming and fertilizer feeding unit above described, is a device to fill in the furrow and tamp down or roll the dirt with which the furrow is filled.

Such device is particularly shown in Figs. 3 and 5 and comprises a longitudinal arm unit 41 pivoted at its forward end on standard 35, as at 42.

A cross bar 43 is supported from arm unit 41 on an upstanding bracket 44 and adjustably supports transversely spaced depending stems 45 on the lower end of which ground engaging discs 46 are mounted. These discs are disposed to the sides of shoe 32 immediately back of the same and are diagonaled relative to each other and to the furrow 33 so that with forward movement of the machine, dirt 47 is shifted laterally from the surface to the sides of the furrow and into the same, as shown in Fig. 3, substantially filling the furrow and covering the fertilizer.

Mounted on the arm unit 41, at the rear end thereof, is a depending centrally disposed roller wheel 48 arranged to engage and compact the dirt 47 in furrow 33.

Compacting pressure is imparted to the wheel by a compression spring 49 mounted on a stem 50 connected at its lower end on the arm unit 41 and slidable through a bracket 51 projecting from one of the cross arms 37, as shown in Fig. 3.

It may here be noted that there is one hopper 29 for each pair of furrow opening and fertilizer distributing devices, as is common practice and as shown in Fig. 1.

Each such hopper also includes a rotary fertilizer agitator (not shown); the agitators of both hoppers being driven from the rear wheel 9, when the latter is in ground engagement, by an initial chain drive 52 extending from the wheel 9 to the pivot 11 of the wheel mounting arms 10; another chain drive 53 extends from pivot 11 to a transverse countershaft 54 mounted on frame 7 rearwardly of the hoppers, while final chain drives 55 connect the countershaft and the agitator shafts of the various hoppers.

Another centrally disposed leveling and dirt deflecting blade 56 is disposed rearwardly of wheel 48; such blade being mounted on an upstanding standard 57 adjustably secured to cross bars 58 on frame 7 by a clamping unit 59.

Disposed behind blade 56 in floating relation to the ground is a seed planting unit 60 of conventional form.

This unit includes a longitudinal frame 61 pivoted at its forward end on standard 57, as at 62. Adjacent its rear end, frame 61 is connected to an upstanding yoke 63 from which a rod 64 projects upwardly and slides through a cross bar 65 provided on frame 7.

A compression spring 66 is disposed about the rod between the cross bar and a stop collar 67 on the rod below and acts to yieldably urge frame 61 downwardly.

Another collar 68 on rod 64 above bar 65 limits downward movement of said frame 61 so that when frame 7 is elevated a certain distance the frame 61 will then be lifted also.

Unit 60 also includes a front-end wheel 69 riding on the compacted dirt 47 in the furrow and adding to the compacting thereof; and a furrow-opening plow 70 is also included to provide a relatively shallow furrow or trough 71 into which the seeds 72 from the hopper 73 of unit 60 are dropped in suitably spaced order by the operation of the seed plate 74 of the unit.

Said unit 60 additionally includes blades 75 to shift dirt laterally so as to fill in the furrow 71 over the seed, as shown at 76 in Fig. 4, and rear-end compacting rollers 77 to press down such filled-in dirt.

This completes the seeding operation, and by reason of the individual or separate vertical adjustability of the initial furrow-forming device and the seed planter relative to each other and to the ground, the depth of furrow 33 may be varied to suit different conditions; while the depth of the seed receiving furrow 71—and the thickness of the layer of fertilizer-covering dirt 47, and of the layer of seed-covering dirt—may also be varied as may be desired.

By reason of the fact that the various ground working instrumentalities, including the fertilizing unit and the seed planting unit, are all mounted on the auxiliary frame 7 (which is arranged for direct vertical movement relative to the main frame), all such instrumentalities are raised simultaneously from the ground whenever the rams 24 are actuated to raise the frame 7.

It may be noted that ground loosening or shaping devices other than the specific discs 27 may be used for the purpose if desired. Also, individual fertilizer hoppers, one for each row, may be employed if found advisable.

The transversely spaced rollers 77 tend to pack the dirt at ground level, forming a relatively small crown C; i. e., without compacting the dirt directly over the seed. This makes for more favorable emergence conditions than would otherwise be obtained.

The castor wheel units 5 assure that the runners remain at proper level at the forward end, which is essential to accurate operation of the implement.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A seed planting machine comprising a frame structure supported for movement along the ground, a fertilizer distributing unit on the frame structure, said unit including a furrow digging shoe into which the fertilizer is fed so as to deposit such fertilizer into the bottom of the furrow, means to then deflect dirt into the furrow to partially fill the same, and a compacting wheel to then compact the deflected dirt in the furrow; a dirt leveling and deflecting blade supported by the frame structure in position to engage the dirt in the furrow rearwardly of the compacting wheel, a ground compacting wheel to engage the dirt in the furrow after the blade has acted thereon, and a seed planting unit supported from the frame structure rearwardly of said last named compacting wheel.

2. In an implement of the character described the combination of: a supporting frame mounted for transport over the surface of the ground; a furrow digging shoe supported by the frame and adapted to dig a furrow in the ground to a predetermined depth, means to feed fertilizing material into the bottom of the furrow, means to cover the fertilizer with soil to a depth partially filling the furrow, means to compact such soil within the furrow, a leveling blade supported by the frame and adapted to project into the furrow and engage and level off the soil which has been compacted over the fertilizer in the furrow, means to compact such leveled off soil in the furrow, means to deposit seed on such leveled off soil in the furrow, and means to then cover such seed and substantially fill the furrow with soil.

References Cited in the file of this patent

UNITED STATES PATENTS

| Number | Name | Date |
| --- | --- | --- |
| 225,804 | Dart | Mar. 23, 1880 |
| 330,022 | Harter | Nov. 10, 1885 |
| 715,556 | Crowder | Dec. 9, 1902 |
| 806,005 | Rudge | Nov. 28, 1905 |
| 808,000 | Brennan | Dec. 19, 1905 |
| 1,048,074 | Hood | Dec. 24, 1912 |
| 1,067,956 | Wilcox | July 22, 1913 |
| 1,112,962 | Alcorn | Oct. 6, 1914 |
| 1,247,763 | White | Nov. 27, 1917 |
| 1,696,562 | Allen | Dec. 25, 1928 |
| 1,893,512 | Zuckerman | Jan. 10, 1933 |
| 2,230,331 | Mobley | Feb. 4, 1941 |
| 2,322,332 | White | June 22, 1943 |
| 2,361,100 | Hipple | Oct. 24, 1944 |
| 2,571,407 | Bauer | Oct. 16, 1951 |
| 2,656,801 | Hansen et al. | Oct. 27, 1953 |

UNITED STATES PATENT OFFICE
CERTIFICATE OF CORRECTION

Patent No. 2,869,490  
January 20, 1959

Henry Huber et al.

It is hereby certified that error appears in the printed specification of the above numbered patent requiring correction and that the said Letters Patent should read as corrected below.

Column 1, line 16, for "speed" read -- seed --.

Signed and sealed this 16th day of June 1959.

(SEAL)  
Attest:

KARL H. AXLINE  
Attesting Officer

ROBERT C. WATSON  
Commissioner of Patents